United States Patent
Park et al.

(10) Patent No.: US 11,644,042 B2
(45) Date of Patent: May 9, 2023

(54) APPARATUS FOR COMPRESSOR

(71) Applicant: LG ELECTRONICS INC., Seoul (KR)

(72) Inventors: Hanyoung Park, Seoul (KR); Yoonjei Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 48 days.

(21) Appl. No.: 17/173,586

(22) Filed: Feb. 11, 2021

(65) Prior Publication Data

US 2021/0262479 A1 Aug. 26, 2021

(30) Foreign Application Priority Data

Feb. 25, 2020 (KR) .................. 10-2020-0023196

(51) Int. Cl.
*F04D 27/02* (2006.01)
*F04D 29/041* (2006.01)
*F04D 29/048* (2006.01)
*F04D 27/00* (2006.01)
*F04D 17/12* (2006.01)

(52) U.S. Cl.
CPC .............. *F04D 27/02* (2013.01); *F04D 17/12* (2013.01); *F04D 27/001* (2013.01); *F04D 27/0261* (2013.01); *F04D 29/048* (2013.01); *F04D 29/0413* (2013.01); *F05D 2270/334* (2013.01)

(58) Field of Classification Search
CPC ........ F04D 17/12; F04D 27/001; F04D 27/02; F04D 27/0261; F04D 27/0223; F04D 29/048
See application file for complete search history.

(56) References Cited

U.S. PATENT DOCUMENTS

2013/0309060 A1* 11/2013 Johnsen ................ F04D 27/001
  415/118
2017/0097006 A1*  4/2017 Hossain ................ F04D 29/058

FOREIGN PATENT DOCUMENTS

JP       2018-159306    10/2018
KR       10-1084477     11/2011

OTHER PUBLICATIONS

Shoyama, Turbo Compressor—"JP2018159306A_MachTrans.pdf", (Oct. 2018) (Year: 2018).*
Korean Notice of Allowance issued in Application No. 10-2020-0023196 dated Jul. 28, 2021.

* cited by examiner

*Primary Examiner* — Kenneth J Hansen
(74) *Attorney, Agent, or Firm* — Ked & Associates (57) ABSTRACT

A compressor that vibrates a rotary shaft or changes an operating frequency of a motor, in response to a vibration frequency of a discharge passage falling outside of a normal range. The compressor may include one or more impeller configured to draw in and compress refrigerant; a motor configured to rotate the one or more impeller; a rotary shaft, to which the one or more impeller and the motor are coupled; at least two thrust bearings that limit vibration of the rotary shaft; a vibration measuring sensor configured to measure a vibration frequency of a discharge passage; and a controller configured to control the at least two thrust bearings based on the vibration frequency. Upon determining that the vibration frequency falls outside of a normal vibration frequency range, the controller controls the at least two thrust bearings to vibrate the rotary shaft a predetermined number of times.

13 Claims, 8 Drawing Sheets

APPARATUS FOR COMPRESSOR

CROSS-REFERENCE TO RELATED APPLICATION(S)

This application claims priority under 35 U.S.C. § 119 to Korean Application No. 10-2020-0023196 filed on Feb. 25, 2020, whose entire disclosure are hereby incorporated by reference.

BACKGROUND OF THE INVENTION

1. Field of the Invention

The present disclosure relates to a compressor and a method of controlling the same.

2. Description of the Related Art

Generally, chiller systems supply chilled water to demand sources of chilled water, and provide cooling by heat exchange between a refrigerant, circulating through a refrigeration system, and chilled water circulating between the demand sources and the refrigeration system. As large-capacity cooling equipment, the chiller systems may be installed in large buildings and the like.

Korean Registered Patent No. 10-1084477 discloses a general chiller system. The chiller system disclosed in the related art has a problem in that surge occurs in a rotating compressor. Surge takes place when a compression ratio of the compressor is higher than a flow rate of the refrigerant, and causes an irregular flow of the refrigerant as a rotating body of the compressor rotates idle. During the occurrence of surge, the compressor does not produce a higher pressure than a pressure resistance of the system.

Accordingly, when the surge occurs, the refrigerant repeatedly backflows, thereby frequently causing damage to the compressor.

Therefore, there is a need for a method to prevent damage to the compressor caused by the occurrence of surge in the chiller system, as well as to solve a problem in that after the surge occurs in the compressor, damage is already caused to the compressor even when a control operation is performed to remove the surge.

PRIOR ART DOCUMENT

Patent Document

Korean Patent No. 10-1084477

SUMMARY OF THE INVENTION

It is an object of the present disclosure to provide a method of preventing damage to a compressor which is caused by a surge event occurring in the compressor.

It is another object of the present disclosure to provide a method of predicting a stage prior to the occurrence of surge based on a vibration frequency of a discharge passage of the compressor, thereby preventing in advance damage to the compressor and efficiency reduction of the compressor.

It is yet another object of the present disclosure to provide a method of efficiently preventing the occurrence of surge by changing an operating frequency of a motor or by vibrating a rotating shaft in various directions, when a surge event is predicted to occur.

The objects of the present disclosure are not limited to the aforementioned objects and other objects not described herein will be clearly understood by those skilled in the art from the following description.

In order to achieve the above objects, a compressor according to an embodiment of the present disclosure vibrates a rotating shaft or changes an operating frequency of a motor, in response to a vibration frequency of a discharge passage falling outside a normal range.

Specifically, in accordance with an aspect of the present disclosure, the above and other objects can be accomplished by providing a compressor, including: one or more impellers configured to draw in and compress a refrigerant; a motor configured to rotate the impellers; a rotating shaft, to which the impellers and the motor are coupled; a discharge passage, through which the refrigerant compressed by the impellers is discharged; a vibration measuring sensor configured to measure a vibration frequency of the discharge passage; and a controller configured to control an operating frequency of the motor based on the vibration frequency measured by the vibration measuring sensor.

Upon determining that the vibration frequency falls outside a normal vibration frequency range, the controller may perform a surge avoidance operation of changing the operating frequency of the motor a predetermined number of times.

The surge avoidance operation may include: a first surge avoidance operation for operating the motor at a first operating frequency, which is different from a rated operating frequency, for a first period of time; and a second surge avoidance operation for operating the motor at the rated frequency for a second period of time.

The surge avoidance operation may include alternately performing the first surge avoidance operation and the second surge avoidance operation a predetermined number of times.

The first period of time may be less than the second period of time.

The controller may control the motor to alternately perform the first surge avoidance operation and the second surge avoidance operation until the vibration frequency is restored to the normal vibration frequency range.

In addition, the compressor may further include at least two thrust bearings limiting vibration of the rotating shaft in an axial direction, wherein upon determining that the vibration frequency falls outside the normal vibration frequency range, the controller may control the two thrust bearings to vibrate the rotating shaft in the axial direction a predetermined number of times.

The thrust bearings may include a first thrust bearing and a second thrust bearing, with at least a portion of the rotating shaft being disposed between the first thrust bearing and the second thrust bearing.

Upon determining that the vibration frequency falls outside the normal vibration frequency range, the controller may change, a predetermined number of times, a current supplied to the first thrust bearing and a current supplied to the second thrust bearing.

Upon determining that the vibration frequency falls outside the normal vibration frequency range, the controller may perform the surge avoidance operation of changing an operating frequency of the motor a predetermined number of times.

Moreover, the compressor may further include a plurality of magnetic bearings supporting the rotating shaft in a radial direction intersecting the axial direction of the rotating shaft, wherein upon determining that the vibration frequency falls outside the normal vibration frequency range, the controller may control the plurality of magnetic bearings to vibrate the rotating shaft in the radial direction a predetermined number of times.

Upon determining that the vibration frequency falls outside the normal vibration frequency range, the controller may change currents, supplied to the respective magnetic bearings, a predetermined number of times.

The compressor may further include: at least two thrust bearings limiting vibration of the rotating shaft in the axial direction; and a plurality of magnetic bearings supporting the rotating shaft in a radial direction intersecting the axial direction of the rotating shaft, wherein upon determining that the vibration frequency falls outside the normal vibration frequency range, the controller may control the two thrust bearings to vibrate the rotating shaft in the axial direction a predetermined number of times, and may control the plurality of magnetic bearings to vibrate the rotating shaft in the radial direction a predetermined number of times.

In accordance with another aspect of the present disclosure, the above and other objects can be accomplished by providing a compressor, including: one or more impellers configured to draw in and compress a refrigerant; a motor configured to rotate the impellers; a rotating shaft, to which the impellers and the motor are coupled; at least two thrust bearings limiting vibration of the rotating shaft in an axial direction; a vibration measuring sensor configured to measure a vibration frequency of a discharge passage; and a controller configured to control the thrust bearings based on the vibration frequency measured by the vibration measuring sensor, wherein upon determining that the vibration frequency falls outside a normal vibration frequency range, the controller may control the two thrust bearings to vibrate the rotating shaft in the axial direction a predetermined number of times.

In addition, the compressor may further include a plurality of magnetic bearings supporting the rotating shaft in a radial direction intersecting the axial direction of the rotating shaft, wherein upon determining that the vibration frequency falls outside the normal vibration frequency range, the controller may control the plurality of magnetic bearings to vibrate the rotating shaft in the radial direction a predetermined number of times.

In accordance with yet another aspect of the present disclosure, the above and other objects can be accomplished by providing a compressor, including: one or more impellers configured to draw in and compress a refrigerant; a motor configured to rotate the impellers; a rotating shaft, to which the impellers and the motor are coupled; a plurality of magnetic bearings supporting the rotating shaft in a radial direction intersecting the axial direction of the rotating shaft; a vibration measuring sensor configured to measure a vibration frequency of a discharge passage; and a controller configured to control the magnetic bearings based on the vibration frequency measured by the vibration measuring sensor, wherein upon determining that the vibration frequency falls outside a normal vibration frequency range, the controller may control the plurality of magnetic bearings to vibrate the rotating shaft in the radial direction a predetermined number of times.

Other detailed matters of the exemplary embodiments are included in the detailed description and the drawings.

The compressor and the method of controlling the same according to the present disclosure have one or more of the following effects.

First, by preventing the occurrence of surge, damage to the compressor may be prevented.

Second, a position of the rotating shaft is adjusted by predicting in advance the occurrence of surge, such that when surge takes place, it is possible to quickly prevent the rotating shaft from being biased toward the impellers.

Third, by moving the position of the rotating shaft in advance before the occurrence of surge, damage to the compressor may be prevented with less force compared to a case where the rotating shaft is located at a reference position when the surge takes place, and the volume of the thrust bearing, as well as the amount of current, may be reduced.

DETAILED DESCRIPTION OF THE PREFERRED EMBODIMENTS

Advantages and features of the present disclosure and methods for accomplishing the same will be more clearly understood from exemplary embodiments described below with reference to the accompanying drawings. However, the present disclosure is not limited to the following embodiments but may be implemented in various different forms. The embodiments are provided only to complete disclosure of the present disclosure and to fully provide a person having ordinary skill in the art to which the present disclosure pertains with the category of the present disclosure, and the present disclosure will be defined by the scope of the appended claims. Wherever possible, the same reference numbers will be used throughout the drawings to refer to the same or like parts.

Spatially-relative terms such as "below", "beneath", "lower", "above", or "upper" may be used herein to describe one element's relationship to another element as illustrated in the Figures. It will be understood that spatially-relative terms are intended to encompass different orientations of the device in addition to the orientation depicted in the Figures. For example, if the device in one of the figures is turned over, elements described as "below" or "beneath" other elements would then be oriented "above" the other elements. The exemplary terms "below" or "beneath" can, therefore, encompass both an orientation of above and below. Since the device may be oriented in another direction, the spatially-relative terms may be interpreted in accordance with the orientation of the device.

The terminology used in the present disclosure is for the purpose of describing particular embodiments only and is not intended to limit the disclosure. As used in the disclosure and the appended claims, the singular forms "a", "an" and "the" are intended to include the plural forms as well, unless context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, the thickness or size of each constituent element is exaggerated, omitted, or schematically illustrated for convenience of description and clarity. Also, the size or area of each constituent element does not entirely reflect the actual size thereof.

Hereinafter, preferred embodiments of the present disclosure will be described with reference to the accompanying drawings.

Embodiments of the present disclosure will be described below with reference to the accompanying drawings for explaining a compressor.

Figure 1:
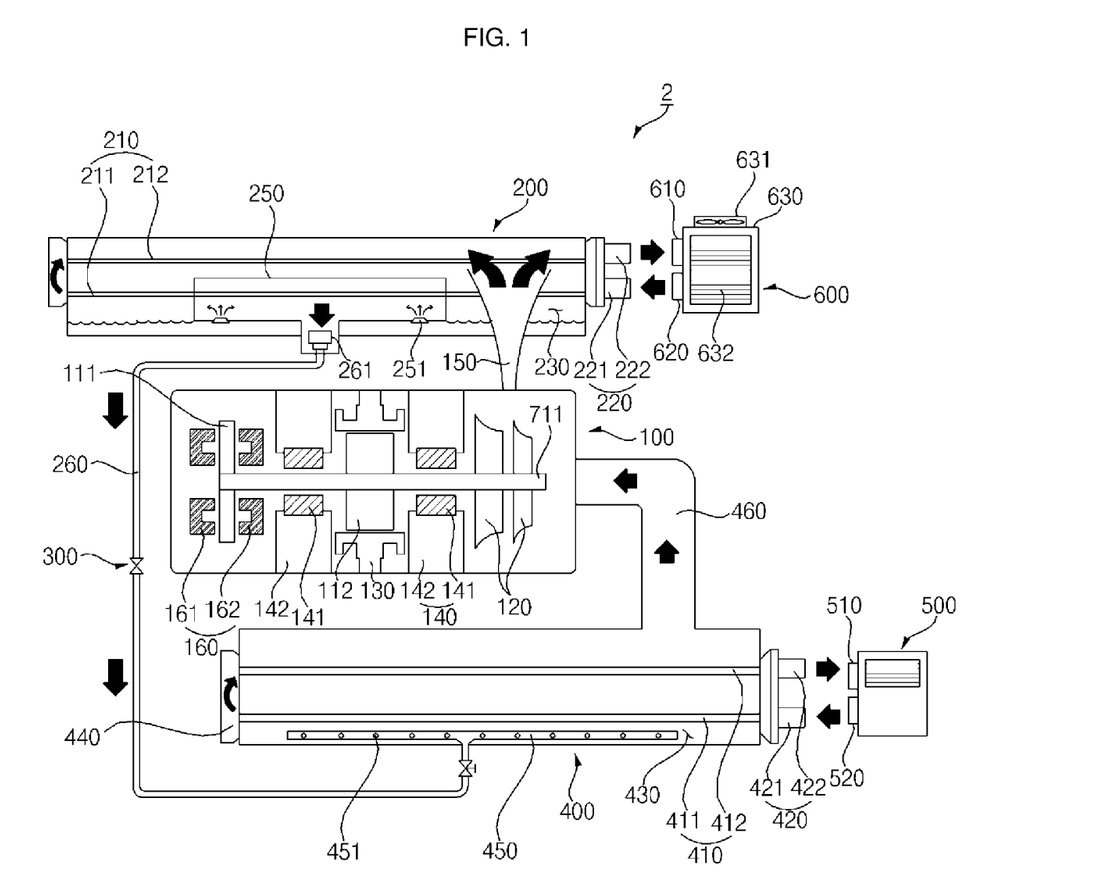
FIG. 1 is a diagram illustrating a chiller system according to an embodiment of the present disclosure.

FIG. 1 is a chiller system including a compressor 100 of the present disclosure. The compressor 100 according to an embodiment of the present disclosure may not only function as part of a chiller system, but may also be included in an air conditioner and any other device as long as the device may compress a gaseous material.

Referring to FIG. 1, a chiller system 1 according to an embodiment of the present disclosure includes: a compressor 100 configured to compress a refrigerant; a condenser 200 configured to condense the refrigerant by heat-exchange between the refrigerant, compressed by the compressor 100, and a coolant; an expander 300 configured to expand the refrigerant condensed by the condenser 200; an evaporator 400 configured to cool chilled water while evaporating the refrigerant by heat-exchange between the refrigerant, expanded by the expander 300, and the chilled water.

In addition, the chiller system 1 according to an embodiment of the present disclosure may further include: a coolant unit 600 configured to heat the coolant by heat-exchange between the compressed refrigerant and the coolant at the condenser 200; and an air conditioning unit 500 configured to cool the chilled water by heat-exchange between the expanded refrigerant and the chilled water at the evaporator 400.

The condenser 200 provides a space for heat-exchange between a high-pressure refrigerant, compressed by the compressor 100, and the coolant introduced from the coolant unit 600. The high-pressure refrigerant may be condensed by heat-exchange with the coolant.

The condenser 200 may include a shell-tube type heat exchanger. Specifically, the high-pressure refrigerant, compressed by the compressor 100, may be introduced into a condensing space 230, corresponding to an internal space of the condenser 200, through a discharge passage 150. Further, a coolant passage 210, through which the coolant introduced from the coolant unit 600 may flow, is formed in the condensing space 230.

The coolant passage 210 may include a coolant inlet passage 211, into which the coolant is introduced from the coolant unit 600, and a coolant discharge passage 212, through which the coolant is discharged to the coolant unit 600. The coolant introduced into the coolant inlet passage 211 may be heat-exchanged with the refrigerant inside the condensing space 230, and then may pass through a coolant connection passage 240, formed at one end inside the condenser 200 or formed outside thereof, to be introduced into the coolant discharge passage 212.

The coolant unit 600 and the condenser 200 may be connected to each other through a coolant tube 220. The coolant tube 220 may serve as a flow path of the coolant between the coolant unit 600 and the condenser 200, and may be made of a rubber material and the like so as to prevent the coolant from leaking to the outside.

The coolant tube 220 includes a coolant inlet tube 221 connected to the coolant inlet passage 211, and a coolant discharge tube 222 connected to the coolant discharge passage 212. As for the overall coolant flow, after heat-exchange with air or a liquid at the coolant unit 600, the coolant is introduced into the condenser 200 through the coolant inlet tube 221. The coolant introduced into the condenser 200 sequentially passes through the coolant inlet passage 211, the coolant connection passage 240, and the coolant discharge passage 212 which are provided in the condenser 200, so as to be heat-exchanged with the refrigerant introduced into the condenser 200, and then passes through the coolant discharge tube 222 again to flow into the coolant unit 600.

The coolant, having absorbed heat from the refrigerant by heat-exchange at the condenser 200, may be air-cooled by the coolant unit 600. The coolant unit 600 includes a main body 630, a coolant inlet pipe 610 serving as an inlet through which the coolant having absorbed heat is introduced, and a coolant discharge pipe 620 serving as an outlet through which the coolant after being cooled in the coolant unit 600 is discharged.

By using air, the coolant unit 600 may cool the coolant introduced into the main body 630. Specifically, the main body 630 has a fan generating an air flow, an air outlet 631 through which air is discharged, and an air inlet 632 through which air flows into the main body 630.

After being heat-exchanged, air is discharged through the air outlet 631 to be used for heating. The refrigerant, condensed after being heat-exchanged at the condenser 200, stagnates in a lower portion of the condensing space 230. The stagnant refrigerant is fed into a refrigerant box 250, provided inside the condensing space 230, to flow into the expander 300.

The refrigerant box 250 is introduced into a refrigerant inlet 251, and the introduced refrigerant may be discharged to an evaporator connection passage 260. The evaporator connection passage 260 has an evaporator connection passage inlet 261 which may be disposed below the refrigerant box 250.

The evaporator 400 may include an evaporation space 430 in which heat-exchange takes place between the refrigerant, expanded by the expander 300, and chilled water. In the evaporator connection passage 260, the refrigerant having passed through the expander 300 is connected to a refrigerant injection device 450 provided in the evaporator 400, and passes through a refrigerant injection hole 451 to spread evenly inside the evaporator 400.

Further, in the evaporator 400, a cold water passage 410 is provided which includes: a cold water inlet passage 411, through which cold water flows into the evaporator 400; and a cold water discharge passage 412, through which the cold water is discharged outside of the evaporator 400.

The cold water may be introduced or discharged through a cold water tube 420 communicating with an air conditioning unit 500 provided outside of the evaporator 400. The cold water tube 420 includes a cold water inlet tube 421, serving as a passage through which cold water inside the air conditioning unit 500 flows toward the evaporator 400, and a cold water discharge tube 422 serving as a passage through which cold water after being heat-exchanged at the evaporator 400 flows toward the air conditioning unit 500. That is, the cold water inlet tube 421 communicates with the cold water inlet passage 411, and the cold water discharge tube 422 communicates with the cold water discharge passage 412.

As for the flow of cold water, after passing through the air conditioning unit 500, the cold water inlet tube 421, and the cold water inlet passage 411, the cold water passes through a cold water connection passage 440 provided at one end inside the evaporator 400 or provided outside thereof, and then flows into the air conditioning unit 500 again through the cold water discharge passage 412 and the cold water discharge tube 422.

The air conditioning unit 500 cools the cold water using a refrigerant. The cooled cold water may absorb heat from air in the air conditioning unit 500 to cool the indoor space. The air conditioning unit 500 may include a cold water discharge pipe 520 communicating with the cold water inlet tube 421, and a cold water inlet pipe 510 communicating with the cold water discharge tube 422. After being heat-exchanged at the evaporator 400, the refrigerant may flow into the compressor 100 again through a connection passage 460 of the compressor 100.

Figure 2:
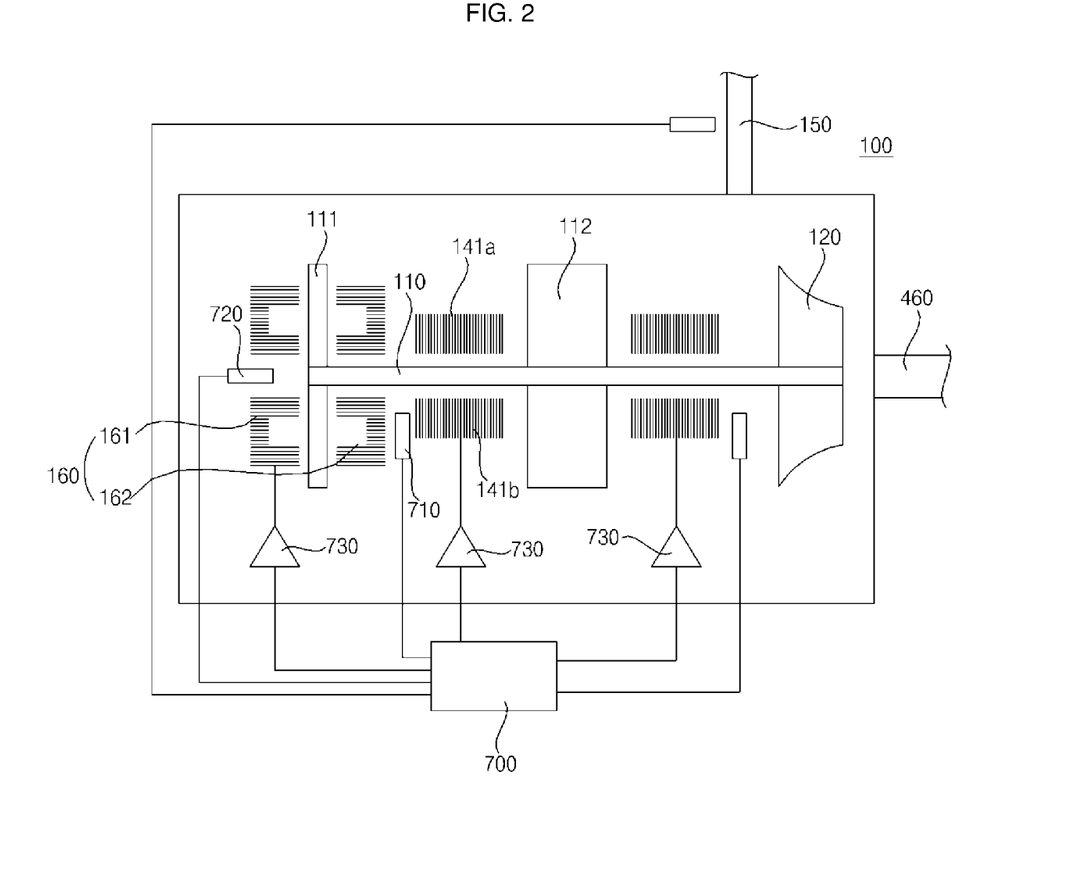
FIG. 2 is a diagram illustrating a structure of a compressor according to an embodiment of the present disclosure.

FIG. 2 is a diagram illustrating the compressor 100 (a so-called turbo compressor) according to an embodiment of the present disclosure.

The compressor 100 illustrated in FIG. 2 includes: one or more impellers 120 for drawing in the refrigerant in an axial direction Ax and compressing the refrigerant in a centrifugal direction; a rotating shaft 110, to which the impellers 120 and a motor 130 rotating the impellers 120 are coupled; a bearing part 140 having a plurality of magnetic bearings 141 supporting the rotating shaft 110 so that the rotating shaft 110 may rotate in the air, and a bearing housing 142 supporting the magnetic bearings 141; a vibration measuring sensor 72 sensing a distance from the rotating shaft 110; and thrust bearings 160 limiting vibration of the rotating shaft 110 in the axial direction Ax. In addition, the compressor 100 of the present disclosure may further include a vibration measuring sensor 72 for measuring a vibration frequency of the discharge passage 150.

The impellers 120 may be generally single-stage or two-stage impellers, and multi-stage impellers may also be used. The impellers 120 may be rotated by the rotating shaft 110, and may compress the refrigerant, introduced in the axial direction Ax, into a high-pressure state by rotation in a centrifugal direction.

The motor 130 has a rotating shaft 110, separately from the rotating shaft 110, and transmits torque to the rotating shaft 110 using a belt (not shown). However, in one embodiment of the present disclosure, the motors 130 and 13 include a stator (not shown) and a rotor 112 to rotate the rotating shaft 110.

The rotating shaft 110 is coupled to the impellers 120 and the motors 130 and 13. The rotating shaft 110 extends in a left-right direction of FIG. 2. Hereinafter, the axial direction Ax of the rotating shaft 110 indicates the left-right direction. The rotating shaft 110 is desirably made of metal, so that the rotating shaft 110 may be moved by a magnetic force of the magnetic bearings 141 and the thrust bearings 160.

In order to prevent vibration in the axial direction Ax (left-right direction) of the rotating shaft 110 by the thrust bearings 160, the rotating shaft 110 desirably has a predetermined area on a plane perpendicular to the axial direction Ax. Specifically, the rotating shaft 110 may further include wings 111 providing a magnetic force sufficient to move the rotating shaft 110 with the magnetic force of the thrust bearings 160. The wings 111 of the rotating shaft 110 may have an area greater than a cross-sectional area of the rotating shaft 110 on the plane perpendicular to the axial direction Ax. The wings 111 of the rotating shaft 110 may extend in a radial direction of the rotating shaft 110.

The magnetic bearings 141 and the thrust bearings 160 are made of a conductive material, around which a coil 143 is wound. The coil 143 serves as a magnet, with a current flowing through the wound coil 143.

A plurality of magnetic bearings 141 are disposed to surround the rotating shaft 110. The magnetic bearings 141 may support the rotating shaft 110 in a radial direction intersecting the axial direction of the rotating shaft 110. The thrust bearings 160 are disposed adjacent to the wings 111 of the rotating shaft 110, which extend in a direction of the radius of rotation of the rotating shaft 110.

The magnetic bearing 141 allows the rotating shaft 110 to rotate without friction while floating in the air. To this end, at least three magnetic bearings 141 should be provided around the rotating shaft 110, and the respective magnetic bearings 141 should be in balance with respect to the rotating shaft 110.

In one embodiment of the present disclosure, four magnetic bearings 141 are symmetrical to each other with respect to the rotating shaft 110, and the rotating shaft 110 may float in the air with the magnetic force generated by coils wound around the respective magnetic bearings 141. As the rotating shaft 110 rotates while floating in the air, energy loss caused by friction may be reduced, compared to a prior art using general bearings.

The compressor 100 may further include the bearing housing 142 supporting the magnetic bearings 141. A plurality of magnetic bearings 141 may be provided, which are spaced apart with a gap therebetween so as not to come into contact with the rotating shaft 110.

The plurality of magnetic bearings 141 are installed at least at two positions of the rotating shaft 110. The two positions are different positions in a longitudinal direction of the rotating shaft 110. As the rotating shaft 110 has a shape of a straight line, it is required to support the rotating shaft 110 at least at two positions, so as to prevent vibration in a circumferential direction.

As for the flow of the refrigerant, the refrigerant, introduced into the compressor 100 through the connection passage 460 of the compressor 100, is compressed in a circumferential direction by the action of the impellers 120, and then is discharged through the discharge passage 150. The connection passage 460 of the compressor 100 is connected to the compressor 100 to allow the refrigerant to be introduced in a direction perpendicular to a rotation direction of the impellers 120.

The thrust bearings 160 may restrict movement caused by vibration of the rotating shaft 110 in the axial direction Ax, and may prevent the rotating shaft 110 from colliding with other components of the compressor 100 when the rotating shaft 110 moves toward the impellers 120 during surge.

Specifically, the thrust bearings 160 include a first thrust bearing 161 and a second thrust bearing 162, which are disposed to surround the wing 111 of the rotating shaft 110 in the axial direction Ax. That is, the first thrust bearing 161, the wing 111 of the rotating shaft 110, and the second thrust bearing 162 are disposed in this order in the axial direction Ax of the rotating shaft 110.

More specifically, the second thrust bearings 162 are disposed closer to the impellers 120 than the first thrust bearings 161, the first thrust bearings 161 are disposed further away from the impellers 120 than the second thrust bearings 162, and at least a portion of the rotating shaft 110 is disposed between the first thrust bearings 161 and the second thrust bearings 162. The wings 111 of the rotating shaft 110 are desirably disposed between the first thrust bearings 161 and the second thrust bearings 162.

Accordingly, the first thrust bearing 161 and the second thrust bearing 162 may provide an effect of minimizing vibration of the rotating shaft 110 in a direction of the rotating shaft 110, by the action of the wings 111 of the rotating shaft 110 and the magnetic force.

The vibration measuring sensor 72 may measure the movement of the rotating shaft 110 in the axial direction Ax (left-right direction). The vibration measuring sensor 72 may also measure the movement of the rotating shaft 110 in an up-down direction (in a direction perpendicular to the axial direction Ax). Further, the vibration measuring sensor 72 may include a plurality of vibration measuring sensors 72.

For example, the vibration measuring sensor 72 may include a first gap sensor 710 measuring a vertical movement of the rotating shaft 110, and a second gap sensor 720 measuring a horizontal movement of the rotating shaft 110. The second gap sensor 720 may be spaced apart from one end of the axial direction Ax of the rotating shaft 110 in the axial direction Ax.

The refrigerant compressed by the impellers 120 may be discharged through the discharge passage 150. The vibration measuring sensor 72 may measure a vibration frequency of the discharge passage 150, and may provide a vibration frequency value to a controller 700 or a storage 740. The vibration measuring sensor 72 may be disposed adjacent to the discharge passage 150. The vibration measuring sensor 72 may measure the vibration of the discharge passage 150 by using an accelerometer or by using various other methods.

When surge occurs, damage is already caused to the compressor 100. Accordingly, the present disclosure provides a method of detecting in advance the occurrence of a surge event in the compressor 100 before it occurs, and preventing the surge at a stage prior to the occurrence of surge.

By sensing the vibration frequency of the discharge passage 150, measurement may be performed more efficiently than by sensing the vibration of the rotating shaft 110, thereby providing convenience in installation of additional equipment.

Figure 3:
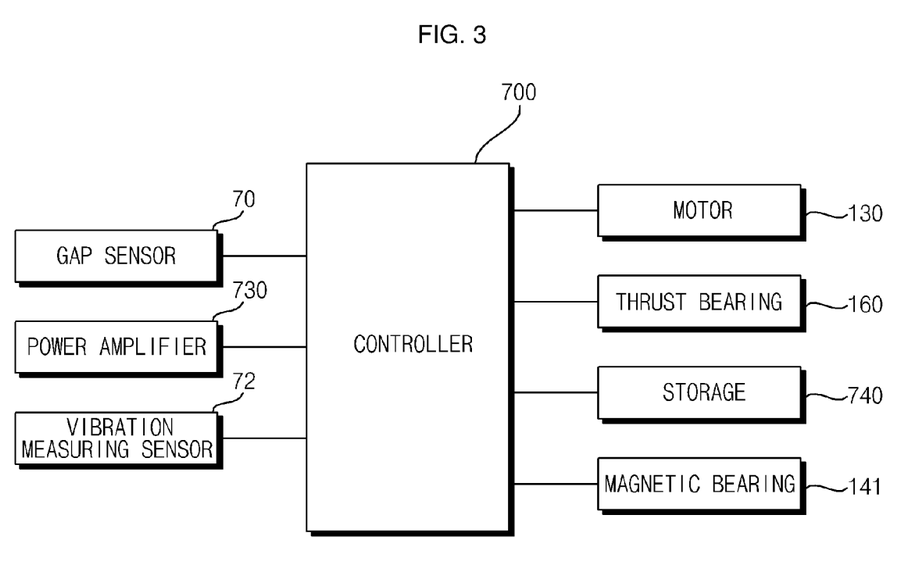
FIG. 3 is a block diagram illustrating a relationship between components connected to a controller according to an embodiment of the present disclosure.

Referring to FIG. 3, in the present disclosure, the controller 700 may be further included which performs a surge avoidance operation based on the vibration frequency measured by the vibration measuring sensor 72.

The controller 700 may control a power amplifier 730 amplifying the magnitude of current applied to the vibration measuring sensor 72, the magnetic bearing 141, the motor 130, and the thrust bearings 160.

By controlling the power amplifier 730, the controller 700 may adjust the magnitude of current applied to the magnetic bearing 141, the motor 130, and the thrust bearings 160; and by using the vibration measuring sensor 72, the controller 700 may detect a change in position of the rotating shaft 110 according to a change in current.

Values measured by the vibration measuring sensor 72 are stored in the storage 740. Data, such as a reference position C0, a normal position range (−C1 to +C1), an eccentric position, and the like, may be pre-stored in the storage 740. The data may be used for later determination on conditions of surge occurrence, in which by comparing the values stored in the storage 740 with measured values, the controller 700 may determine whether to perform a surge avoidance operation.

Specifically, upon determining that the vibration frequency falls outside a normal vibration frequency range, the controller 700 may perform the surge avoidance operation.

Most of the surge events in the compressor 100 occur due to rotating stall caused by the growth of flow separation. The magnetic bearing controls the position of the shaft, such that the magnetic bearing may vibrate a shaft for a very short period of time so as not to affect the system, and if an inverter product may manage the flow separation before surge takes place by controlling an RPM of the compressor 100, the controller 100 may perform an operation while avoiding the surge.

The flow separation grows in a direction to close a refrigerant flow passage, such that by analyzing a vibration component of the discharge passage 150, it is possible to detect the growth of flow separation based on a change in a Blade Passing Frequency (BPF) value. The present disclosure provides a method of avoiding surge by observing and controlling the growth of flow separation and removing the flow separation. The BPF may be defined as a value obtained by multiplying the number of blade wings by a current operation frequency of the motor 130.

Here, a normal vibration frequency may be an experimentally determined value. In another example, if the vibration frequency of the discharge passage 150 is less than a BPF value, the controller 700 may determine that the vibration frequency falls outside the normal vibration frequency range. In yet another example, if a vibration frequency of the discharge passage 150, which is less than the BPF value, is maintained for a predetermined period of time, the controller 700 may determine that the vibration frequency falls outside the normal vibration frequency range.

A normal operation of the compressor 100 will be described below.

Figure 4:
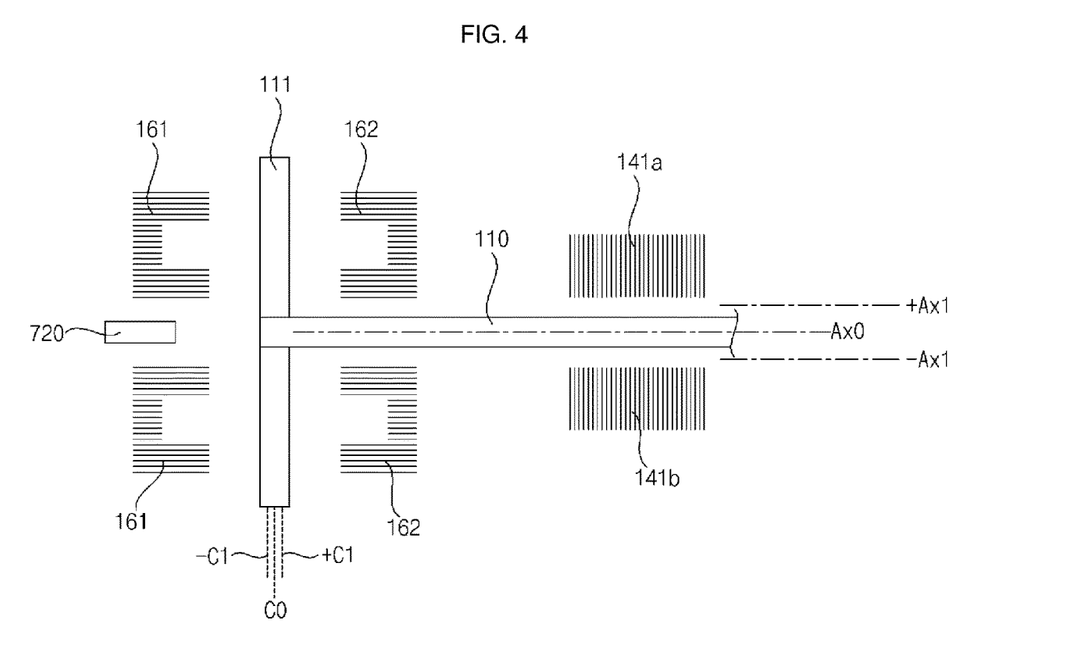
FIG. 4 is a diagram illustrating a case of a normal operation of a compressor according to an embodiment of the present disclosure.

FIG. 4 is a diagram illustrating a case of a normal operation of the compressor 100 according to an embodiment of the present disclosure normally operates.

Referring to FIG. 4, during the normal operation, the controller 700 maintains an operation frequency of the motor 130 at a normal frequency, and controls the rotating shaft 110 to be within a normal position range. Specifically, the controller 700 controls the magnetic bearing 141 to control a position of the rotating shaft 110 in a radial direction, and controls the thrust bearing 160 to control a position of the rotating shaft 110 in the axial direction Ax.

Figure 5A:
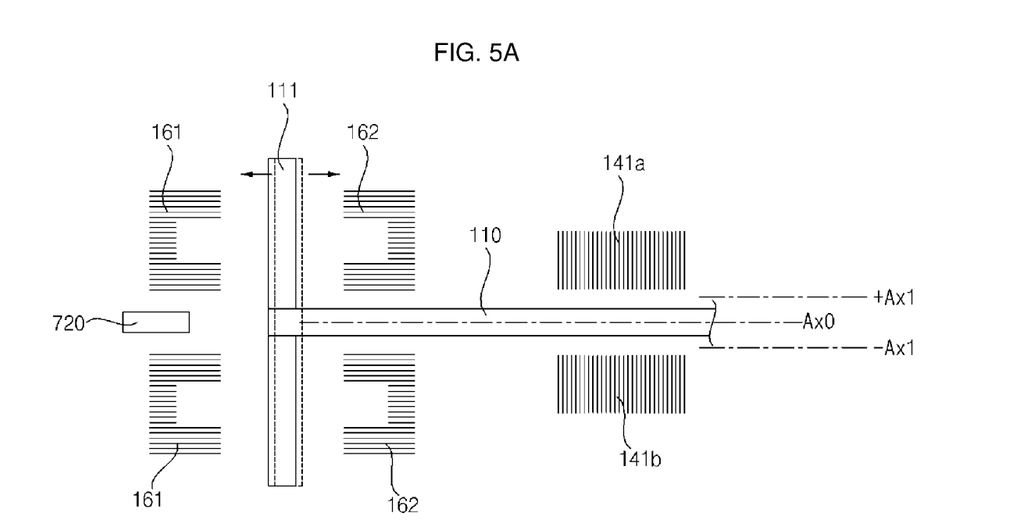
FIG. 5A is a diagram illustrating an example of a surge avoidance operation in a compressor.

Hereinafter, an example of a surge avoidance operation in the compressor 100 will be described with reference to FIG. 5A.

Upon determining that a vibration frequency falls outside a normal vibration frequency range, the controller 700 performs a surge avoidance operation.

For example, the surge avoidance operation is an operation of vibrating the rotating shaft 110 of the compressor 100 in an axial direction a predetermined number of times.

Upon determining that a vibration frequency falls outside a normal vibration frequency range, the controller 700 controls two thrust bearings 160 to vibrate the rotating shaft 110 in the axial direction a predetermined number of times.

Specifically, upon determining that the vibration frequency falls outside the normal vibration frequency range, the controller 700 may change a current supplied to the first thrust bearing 161 and a current supplied to the second thrust bearing 162 a predetermined number of times.

Here, the current supplied to the first thrust bearing 161 and the current supplied to the second thrust bearing 162 may be changed at random a predetermined number of times.

In order to vibrate the rotating shaft 110 at a predetermined frequency in the axial direction a predetermined number of times, the controller 700 may change the current supplied to the first thrust bearing 161 and the current supplied to the second thrust bearing 162, while detecting the position of the rotating shaft 110 in the axial direction based on information received from the vibration measuring sensor 72.

More specifically, upon determining that the vibration frequency falls outside the normal vibration frequency range, the controller 700 may repeatedly perform, a predetermined number of times, an operation of setting a first current value, supplied to the first thrust bearing 161, to be smaller than a second current value supplied to the second thrust bearing 162, and then setting the first current value supplied to the first thrust bearing 161 to be greater than the second current value supplied to the second thrust bearing 162.

In this case, an operating range of the rotating shaft 110 may be set to a smaller range than a limit range, and vibration may be produced within a normal position range (−C1 to +C1) or outside the normal position range (−C1 to +C1).

Figure 5B:
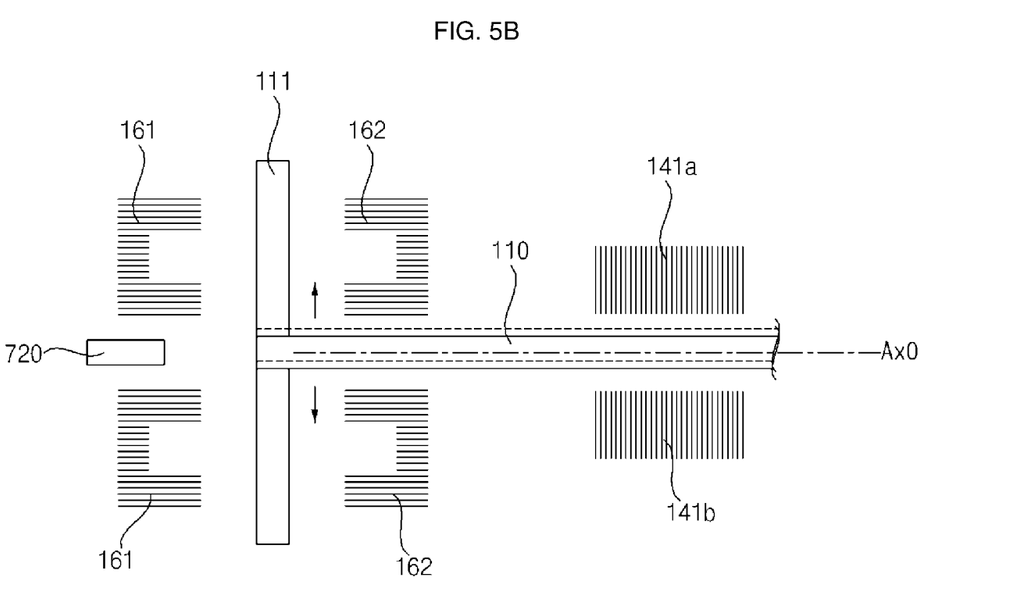
FIG. 5B is a diagram illustrating another example of a surge avoidance operation in a compressor.

Hereinafter, another example of a surge avoidance operation in the compressor 100 will be described with reference to FIG. 5B.

For example, the surge avoidance operation is an operation of vibrating the rotating shaft 110 of the compressor 100 in a radial direction a predetermined number of times.

Upon determining that a vibration frequency falls outside a normal vibration frequency range, the controller 700 controls a plurality of magnetic bearings 141 to vibrate the rotating shaft 110 in the radial direction a predetermined number of times.

Specifically, upon determining that the vibration frequency falls outside the normal vibration frequency range, the controller 700 may change currents, supplied to the respective magnetic bearings 141, a predetermined number of times.

Here, the currents supplied to the respective magnetic bearings 141 are different from each other and may be changed at random a predetermined number of times.

In order to vibrate the rotating shaft 110 at a predetermined frequency in the radial direction a predetermined number of times, the controller 700 may change the currents supplied to the respective magnetic bearings 141, while detecting the position of the rotating shaft 110 in the radial direction based on information received from the vibration measuring sensor 72.

In the present disclosure, the plurality of magnetic bearings 141 are disposed in a circumferential direction; and based on FIG. 5B, a magnetic bearing 141 disposed above the rotating shaft 110 is defined as a first magnetic bearing 141a, and a magnetic bearing 141 disposed below the rotating shaft 110 is defined as a second magnetic bearing 141b.

More specifically, upon determining that the vibration frequency falls outside the normal vibration frequency range, the controller 700 may repeatedly perform, a predetermined number of times, an operation of setting a third current value, supplied to the first magnetic bearing 141a, to be smaller than a fourth current value supplied to the second magnetic bearing 141b, and then setting the third current value supplied to the first magnetic bearing 141a to be greater than the fourth current value supplied to the second magnetic bearing 141b.

In this case, an operating range of the rotating shaft 110 may be set to a smaller range than a limit range, and vibration may be produced within a normal position range (−Ax1 to +Ax1) or outside the normal position range (−Ax1 to +Ax1).

Figure 6:
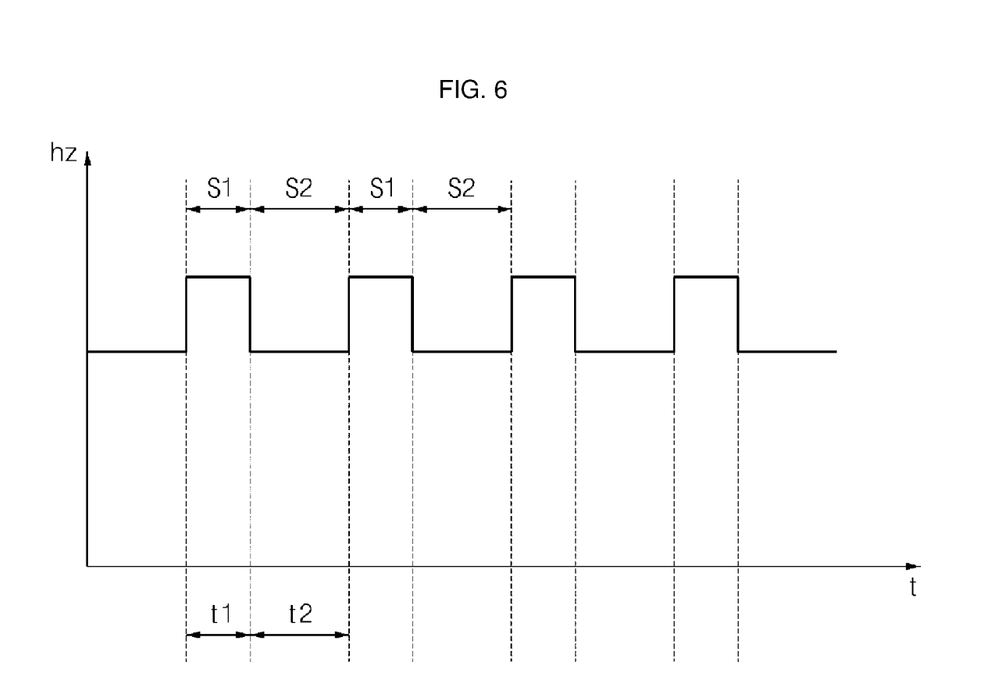
FIG. 6 is a diagram illustrating yet another example of a surge avoidance operation in a compressor.

Hereinafter, yet another example of a surge avoidance operation in the compressor 100 will be described with reference to FIG. 6.

Upon determining that a vibration frequency falls outside a normal vibration frequency range, the controller 700 performs a surge avoidance operation.

For example, the surge avoidance operation is an operation of changing an operating frequency of the motor 130a predetermined number of times, in response to determination that the vibration frequency falls outside the normal vibration frequency range.

Upon determining that the vibration frequency falls outside the normal vibration frequency range, the controller 700 may perform a surge avoidance operation, including a first surge avoidance operation S1 for operating the motor 130 at a first operating frequency, which is different from a rated operating frequency, for a first period of time t1, and a second surge avoidance operation S2 for operating the motor 130 at the rated operating frequency for a second time t2.

Specifically, upon determining that the vibration frequency falls outside the normal vibration frequency range, the controller 700 may change a current value, supplied to the motor 130. Here, upon determining that the vibration frequency falls outside the normal vibration frequency range, the controller 700 may change the current value, supplied to the motor 130, to a value greater or less than a normal operation current value by a predetermined percentage, and then may change the value to the normal operation current value again.

More specifically, the controller 700 may alternately perform the first surge avoidance operation S1 and the second surge avoidance operation S2a predetermined number of times. The controller 700 may control the motor 130 to repeat the first surge avoidance operation S1 and the second surge avoidance operation S2 until the vibration frequency is restored to the normal vibration frequency range.

Here, the first time t1 is desirably less than the second time t2. Further, the first time t1 may be equal to the second time t2.

In another example, the surge avoidance operation may include at least one of the following: changing the operating frequency of the motor 130; vibrating the rotating shaft 110 in the axial direction; and vibrating the rotating shaft 110 in the radial direction.

In still another example, the surge avoidance operation may include sequentially performing the changing of the operating frequency of the motor 130, the vibrating of the rotating shaft 110 in the axial direction, and the vibrating of the rotating shaft 110 in the radial direction, until the vibration frequency is restored to the normal vibration frequency range.

In still another example, the surge avoidance operation may include simultaneously performing the changing of the operating frequency of the motor 130, the vibrating of the rotating shaft 110 in the axial direction, and the vibrating of the rotating shaft 110 in the radial direction, until the vibration frequency is restored to the normal vibration frequency range.

Figure 7:
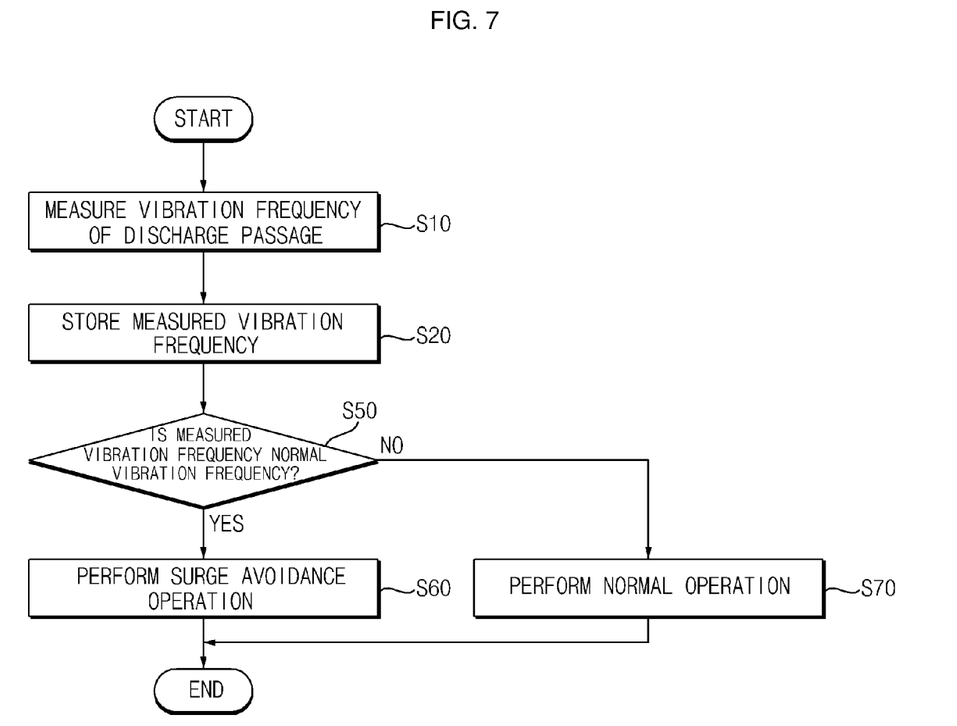
FIG. 7 is a flowchart illustrating a method of controlling a compressor according to an embodiment of the present disclosure.

A method of controlling the compressor 100 is provided in one embodiment of the present disclosure. FIG. 7 is a flowchart illustrating a method of controlling the compressor 100 according to an embodiment of the present disclosure.

The method of controlling the compressor 100 includes: a step (a) of measuring a vibration frequency of the discharge passage 150; a step (b) of determining whether the measured vibration frequency is a normal vibration frequency; and a step (c) of performing a surge avoidance operation if the measured vibration frequency is not the normal vibration frequency.

In addition, if the measured vibration frequency is the normal vibration frequency, the method of controlling the compressor 100 according to the present disclosure may further include a step (d) of adjusting an amount of a current supplied to the thrust bearings 160 and the magnetic bearings 141, so that the rotating shaft 110 may be located at reference positions C0 and Ax0 in S70.

Specifically, in the step (a), a vibration frequency of the discharge passage 150 is measured in S10. In addition, data measured by the vibration measuring sensor 72 is stored in the controller 700 in S20. Specifically, the data may be stored in the storage 740 connected to the controller 700.

Then, it is determined whether the vibration frequency measured by the vibration measuring sensor 72 is a normal vibration frequency in S50. Criteria for determining whether the vibration frequency is the normal vibration frequency are described above.

If the measured vibration frequency is not the normal vibration frequency, the controller 700 performs a surge avoidance operation in S60.

Figure 8:
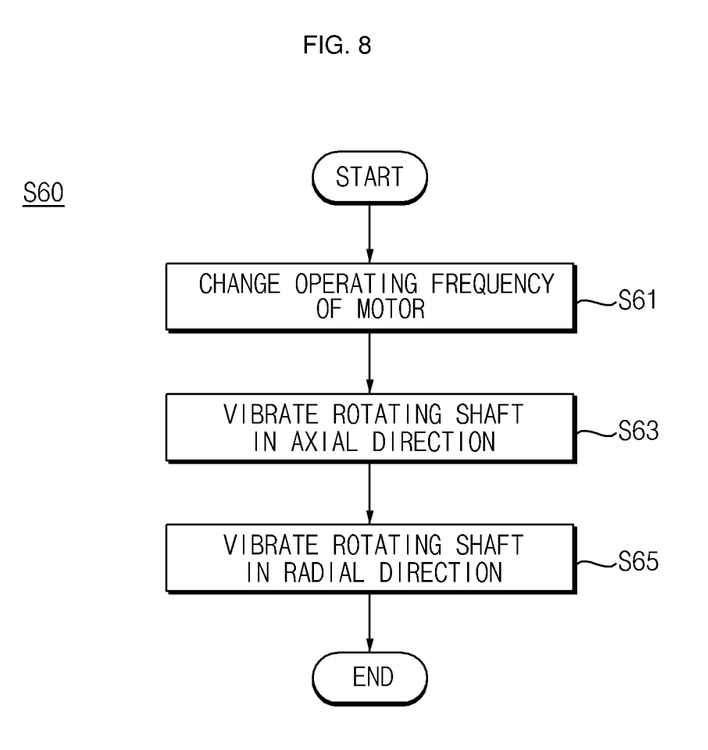
FIG. 8 is a flowchart illustrating a surge avoidance operation in a compressor according to an embodiment of the present disclosure.

FIG. 8 is a flowchart illustrating a surge avoidance operation in the compressor 100 according to an embodiment of the present disclosure.

The surge avoidance operation (S60) includes changing an operating frequency of the motor 130 (S61), vibrating the rotating shaft 110 in the axial direction (S63), and vibrating the rotating shaft 110 in the radial direction (S65).

The changing of the operating frequency of the motor 130 (S61), the vibrating of the rotating shaft 110 in the axial direction (S63), and the vibrating the rotating shaft 110 in the radial direction (S65) may be performed at the same time or at different times, or may be performed sequentially, until a vibrating frequency is restored to a normal vibration frequency range.

The compressor and the method of controlling the same according to the present disclosure have one or more of the following effects.

First, by preventing the occurrence of surge, damage to the compressor may be prevented.

Second, a position of the rotating shaft is adjusted by predicting in advance the occurrence of surge, such that when surge takes place, it is possible to quickly prevent the rotating shaft from being biased toward the impellers.

Third, by moving the position of the rotating shaft in advance before the occurrence of surge, damage to the compressor may be prevented with less force compared to a case where the rotating shaft is located at a reference position when the surge takes place, and the volume of the thrust bearing, as well as the amount of current, may be reduced.

While the present invention has been shown and described with reference to certain embodiments thereof, it will be understood by those skilled in the art that various changes in form and details may be made therein without departing from the spirit and scope of the present invention as defined by the appended claims. Therefore, various modifications can be made to the present invention without departing from the subject of the present invention claimed in the appended claims, and the modifications should not construed separately from the technical idea or prospect of the present invention.

What is claimed is:

1. A compressor, comprising:
   one or more impellers configured to draw in and compress a refrigerant;
   a motor configured to rotate the one or more impellers;
   a rotary shaft, to which the one or more impellers and the motor are coupled;
   at least two thrust bearings that limit vibration of the rotary shaft in an axial direction;
   a vibration measuring sensor configured to measure a vibration frequency of a discharge passage; and
   a controller configured to control the at least two thrust bearings based on the vibration frequency measured by the vibration measuring sensor, wherein upon determining that the vibration frequency falls outside of a normal vibration frequency range, the controller controls the at least two thrust bearings to vibrate the rotary shaft in the axial direction a predetermined number of times.

2. The compressor of claim 1, further comprising a plurality of magnetic bearings that support the rotary shaft in a radial direction intersecting the axial direction of the rotary shaft, wherein upon determining that the vibration frequency falls outside of the normal vibration frequency range, the controller controls the plurality of magnetic bearings to vibrate the rotary shaft in the radial direction a predetermined number of times.

3. The compressor of claim 1, wherein the at least two thrust bearings comprise a first thrust bearing and a second thrust bearing, with at least a portion of the rotary shaft being disposed between the first thrust bearing and the second thrust bearing.

4. The compressor of claim 3, wherein upon determining that the vibration frequency falls outside of the normal vibration frequency range, the controller changes, a predetermined number of times, a current supplied to the first thrust bearing, and a current supplied to the second thrust bearing.

5. The compressor of claim 1, wherein upon determining that the vibration frequency falls outside of the normal vibration frequency range, the controller performs a surge avoidance operation of changing an operating frequency of the motor a predetermined number of times.

6. The compressor of claim 1, further comprising a plurality of magnetic bearings that support the rotary shaft in a radial direction intersecting the axial direction of the rotary shaft, wherein upon determining that the vibration frequency falls outside of the normal vibration frequency range, the controller controls the plurality of magnetic bearings to vibrate the rotary shaft in the radial direction a predetermined number of times.

7. A compressor, comprising:
one or more impellers configured to draw in and compress a refrigerant;
a motor configured to rotate the one or more impellers;
a rotary shaft, to which the one or more impellers and the motor are coupled;
a plurality of magnetic bearings that support the rotary shaft in a radial direction intersecting the axial direction of the rotary shaft;
a vibration measuring sensor configured to measure a vibration frequency of a discharge passage; and
a controller configured to control the plurality of magnetic bearings based on the vibration frequency measured by the vibration measuring sensor, wherein upon determining that the vibration frequency falls outside of a normal vibration frequency range, the controller controls the plurality of magnetic bearings to vibrate the rotary shaft in the radial direction a predetermined number of times.

8. The compressor of claim 7, wherein the controller is configured to control an operating frequency of the motor based on the vibration frequency measured by the vibration measuring sensor.

9. The compressor of claim 8, wherein upon determining that the vibration frequency falls outside of a normal vibration frequency range, the controller performs a surge avoidance operation of changing the operating frequency of the motor a predetermined number of times.

10. The compressor of claim 9, wherein the surge avoidance operation comprises:
a first surge avoidance operation for operating the motor at a first operating frequency, which is different from a rated operating frequency, for a first period of time; and
a second surge avoidance operation for operating the motor at the rated frequency for a second period of time.

11. The compressor of claim 10, wherein the surge avoidance operation comprises alternately performing the first surge avoidance operation and the second surge avoidance operation a predetermined number of times.

12. The compressor of claim 10, wherein the first period of time is less than the second period of time.

13. The compressor of claim 10, wherein the controller controls the motor to alternately perform the first surge avoidance operation and the second surge avoidance operation until the vibration frequency is restored to the normal vibration frequency range.

* * * * *